Dec. 4, 1951 A. G. THOMPSON 2,576,979
FREQUENCY CONVERTER EMPLOYING A DIRECTIONAL COUPLING CIRCUIT
Filed March 4, 1946
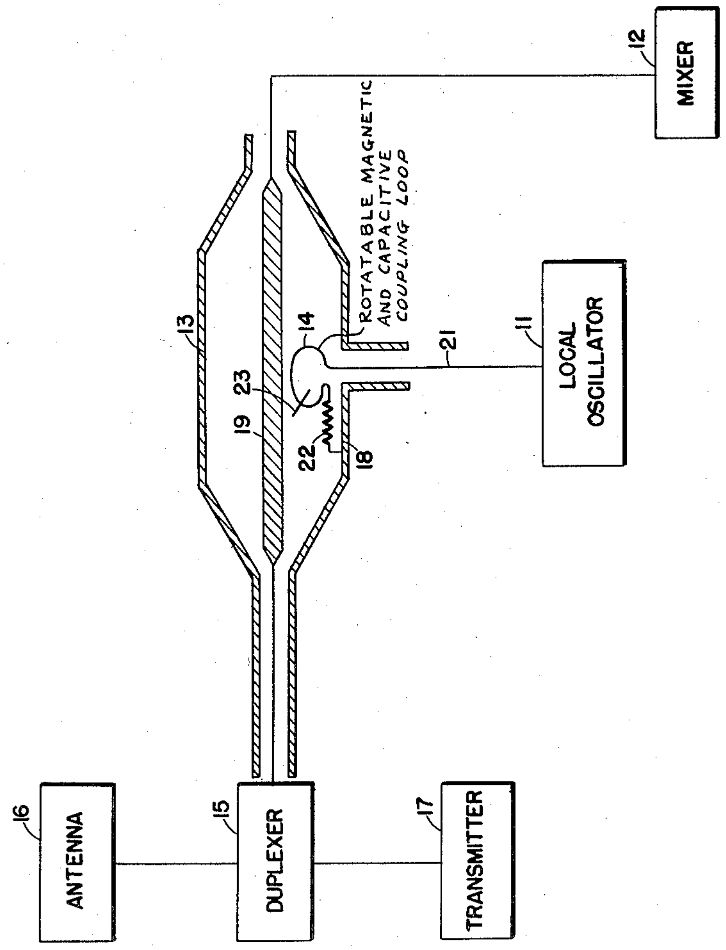
Inventor
ALLAN G. THOMPSON
By M. O. Hayes
Attorney Patented Dec. 4, 1951 2,576,979

UNITED STATES PATENT OFFICE 2,576,979

FREQUENCY CONVERTER EMPLOYING A DIRECTIONAL COUPLING CIRCUIT

Allan G. Thompson, Washington, D. C.

Application March 4, 1946, Serial No. 651,923

2 Claims. (Cl. 250—20)

(Granted under the act of March 3, 1883, as amended April 30, 1928; 370 O. G. 757)

This invention relates to uni-directional coupling means.

The invention provides a means for coupling an oscillator to a coaxial line in such a way that energy from the oscillator travels down the line in one direction but not in the other. It might be used for example to couple a receiver local oscillator to a mixer. The continuous wave from the oscillator can be made to travel down the line to the mixer and not in the other direction to the antenna. This prevents the local oscillator output from reaching the antenna, where it would be radiated and jam nearby equipment.

It is an object of the invention to provide uni-directional coupling from an oscillator to a coaxial line.

It is another object of the invention to provide a means of coupling energy from a local oscillator to a mixer in electronic equipment without allowing energy from the local oscillator to reach the antenna.

The invention will be described with reference to the drawing which shows partly in block and partly in schematic diagram an exemplary embodiment of the invention.

The figure illustrates a uni-directional means for coupling local oscillator 11 to mixer 12 through coaxial line section 13. Coupling loop 14 is arranged to couple energy into the line in a direction toward the mixer only. In this way energy from the local oscillator does not pass through the duplexer 15 to be radiated from antenna 16.

Pulses from transmitter 17 are radiated from antenna 16 and substantially kept out of the receiver by duplexer 15. Received energy from the antenna is guided into coaxial line 13 and thence to the mixer 12.

Coupling loop 14 is inserted between outer conductor 18 and inner conductor 19 of coaxial line section 13. It is connected to the local oscillator through line 21. The loop is also connected to the outer conductor 18 of line 13 through resistor 22.

Loop 14 is coupled both capacitively and magnetically to line 13. The loop can be rotated to change the coupling. The capacitive coupling is essentially the same in all positions of the loop. The phase and magnitude of the wave induced in the line by magnetic coupling, however, depends on the orientation of the loop. The loop is so designed and oriented that for the energy induced in the line 13 in the mixer direction, the wave induced by magnetic coupling is in phase with that induced by capacitive coupling. For energy induced in the line 13 in the duplexer direction, the wave produced by magnetic coupling is out of phase with that induced by capacitive coupling.

The loop is so constructed and oriented that substantially all the energy tending to pass toward duplexer 15 is cancelled out. Energy will then move down the line only toward the mixer.

Disc 23 is used to increase the capacitive coupling from loop 14 to the coaxial line.

Although only one embodiment of the present invention has been disclosed and described herein, it is expressly understood that various changes and substitutions may be made therein without departing from the spirit of the invention as well understood by those skilled in the art. Reference therefore should be had to the appended claims for a definition of the limits of the invention.

The invention described herein may be manufactured and used by or for the Government of the United States of America for governmental purposes without the payment of any royalties thereon or therefor.

What is claimed is:

1. In combination, an oscillator, a coaxial line having an inner and an outer conductor, means supporting a coupling loop in said coaxial line between the inner and outer conductors of said coaxial line in magnetic and capacitive coupling relation with said line, means connecting one end of the coupling loop to the oscillator, resistor means connecting the other end of said loop to the outer conductor of the coaxial line, and means for orienting said coupling loop to induce a voltage in said line by magnetic coupling out of phase with that induced by capacitive coupling in the case where the induced wave travels in a given direction along the coaxial line and to induce a voltage by magnetic coupling in phase with that induced by capacitive coupling in the case where the induced wave travels along the coaxial line in the opposite direction.

2. In a radio receiver including an antenna, a local oscillator and a mixer, means for coupling said oscillator to said mixer comprising a coaxial line having an inner conductor and an outer conductor connecting said mixer and said antenna, means supporting a coupling loop in said coaxial line between said inner and outer conductors in capacitive and magnetic coupling relation with said line, means connecting one end of the coupling loop to said oscillator, resistor means connecting the other end of said coupling loop to the outer conductor of the coaxial line, and means for orienting said loop in said line so that the components of the local oscillator output magnetically and capacitively coupled to the line which flow toward the antenna are out of phase and the components of the local oscillator output magnetically and capacitively coupled to the line which flow toward the mixer are in phase.

ALLAN G. THOMPSON.

REFERENCES CITED

The following references are of record in the file of this patent:

UNITED STATES PATENTS

| Number | Name | Date |
|---|---|---|
| 2,423,416 | Sontherimer | July 1, 1947 |